US012095862B1

United States Patent
Wang et al.

(10) Patent No.: US 12,095,862 B1
(45) Date of Patent: Sep. 17, 2024

(54) DATA PROCESSING SYSTEM AND METHOD

(71) Applicant: ZHEJIANG LAB, Hangzhou (CN)

(72) Inventors: Peilei Wang, Hangzhou (CN); Ruyun Zhang, Hangzhou (CN); Tao Zou, Hangzhou (CN); Shunbin Li, Hangzhou (CN); Peilong Huang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/565,436

(22) PCT Filed: Jul. 5, 2023

(86) PCT No.: PCT/CN2023/105956
§ 371 (c)(1),
(2) Date: Nov. 29, 2023

(30) Foreign Application Priority Data

Apr. 6, 2023 (CN) .......................... 202310370707.0

(51) Int. Cl.
*H04L 67/1097* (2022.01)
*G06F 9/54* (2006.01)

(52) U.S. Cl.
CPC ............ *H04L 67/1097* (2013.01); *G06F 9/54* (2013.01)

(58) Field of Classification Search
CPC .............................. H04L 67/1097; G06F 9/54
See application file for complete search history.

(56) References Cited

U.S. PATENT DOCUMENTS

| 11,010,054 | B1* | 5/2021 | Himelstein | ........... G06F 3/0685 |
| 2011/0314266 | A1* | 12/2011 | Mondri | .................... G06F 9/485 |
| | | | | 713/2 |
| 2022/0374396 | A1* | 11/2022 | Zhou | ................... G06F 16/1774 |

FOREIGN PATENT DOCUMENTS

| CN | 102243655 A | | 11/2011 | |
| CN | 106027576 A | * | 10/2016 | ............. H04L 65/40 |

(Continued)

OTHER PUBLICATIONS

ISA State Intellectual Property Office of the People's Republic of China, International Search Report Issued in Application No. PCT/CN2023/105956, Dec. 26, 2023, WIPO, 6 pages. (Submitted with Machine Translation).

(Continued)

*Primary Examiner* — Shean Tokuta
(74) *Attorney, Agent, or Firm* — The Small Patent Law Group LLC; Christopher R. Carroll

(57) ABSTRACT

The present disclosure provides a data processing system and a data processing method. The system includes: a client interaction module, a subscribing and publishing module, a storage module, and a sub-database management module. The client interaction module is configured to: receive an interaction request sent by a client, analyze the interaction request to obtain an analyzing result, and based on the analyzing result, determine a process type to be started and start a response process of the process type, and repackage the interaction request and send the repackaged interaction request to the response process, where the process type includes a first process type corresponding to the subscribing and publishing module, a second process type corresponding to the storage module and a third process type corresponding to the sub-database management module.

19 Claims, 4 Drawing Sheets

(56) References Cited

FOREIGN PATENT DOCUMENTS

| CN | 106815338 | A |   | 6/2017  |             |
|----|-----------|---|---|---------|-------------|
| CN | 107729551 | A | * | 2/2018  | G06F 16/217 |
| CN | 111131401 | A | * | 5/2020  | H04L 67/1002 |
| CN | 111147308 | A |   | 5/2020  |             |
| CN | 111176801 | A |   | 5/2020  |             |
| CN | 111245918 | A |   | 6/2020  |             |
| CN | 111736809 | A |   | 10/2020 |             |
| CN | 112087327 | A | * | 12/2020 | H04L 41/0813 |
| CN | 112130910 | A |   | 12/2020 |             |
| CN | 112711628 | A |   | 4/2021  |             |
| CN | 114253673 | A | * | 3/2022  |             |
| CN | 114253770 | A | * | 3/2022  | G06F 11/1469 |
| CN | 115858129 | A |   | 3/2023  |             |
| CN | 116107999 | A | * | 5/2023  |             |
| CN | 116107999 | A |   | 5/2023  |             |
| CN | 117935915 | A | * | 4/2024  |             |
| DE | 202014104595 | U1 |   | 11/2014 |         |
| WO | 2010031303 | A1 |   | 3/2010  |             |

OTHER PUBLICATIONS

ISA State Intellectual Property Office of the People's Republic of China, Written Opinion of the International Searching Authority Issued in Application No. PCT/CN2023/105956, Dec. 26, 2023, WIPO, 10 pages. (Submitted with Machine Translation).

State Intellectual Property Office of the People's Republic of China, Office Action and Search Report Issued in Application No. 2023103707070, May 19, 2023, 10 pages. (Submitted with Machine/Partial Translation).

Brandon Haynes etc. "VSS:A storage system for viedo analytics""Research Data Management Track Paper" Jun. 18, 2021, 12 pages.

* cited by examiner

| client_info_s *client_info_list[MAX_CLIENT_NUM]; | | |
|---|---|---|
| client_info_list[0] | client_info_list[1] | ... |

DATA PROCESSING SYSTEM AND METHOD

CROSS REFERENCE TO RELATED APPLICATIONS

This application is a national phase entry of and claims priority to International Patent Application No. PCT/CN2023/105956 (filed 5 Jul. 2023), which claims priority to Chinese Patent Application No. 202310370707.0 (filed 6 Apr. 2023), the entire contents of which are incorporated herein by reference.

TECHNICAL FIELD

The present disclosure relates to the field of database technologies, and in particular to a data processing system and a data processing method.

BACKGROUND

With the continuous development of computer technology, databases can be applied in various industries, thereby facilitating the data storage needs of various industries.

Database services can provide multiple functions, such as adding, deleting, modifying, and querying data in the database, managing database state, etc. However, in the related art, the database services tend to start a unified process regardless of which function is required to be performed by the database. This method results in lower execution efficiency of database services.

Therefore, how to improve the execution efficiency of the database is a problem to be solved.

SUMMARY

The present disclosure provides a data processing system and method to solve the above-mentioned problem in the related art.

According to a first aspect of embodiments of the present disclosure, there is provided a data processing system, including: a client interaction module, a subscribing and publishing module, a storage module, and a sub-database management module: where
  the client interaction module is configured to: receive an interaction request sent by a client, analyze the interaction request to obtain an analyzing result, and based on the analyzing result, determine a process type to be started and start a response process of the process type, and repackage the interaction request and send the repackaged interaction request to the response process, where the process type includes a first process type corresponding to the subscribing and publishing module, a second process type corresponding to the storage module and a third process type corresponding to the sub-database management module;
  the storage module is configured to: start a slave-process corresponding to each data type in an initialization phase, when a response process corresponding to the second process type receives the repackaged interaction request, determine a data type of data to be processed by the repackaged interaction request as a target data type based on the repackaged interaction request, and forward the repackaged interaction request to a slave-process corresponding to the target data type to cause the slave-process to perform data query or data storage based on the repackaged interaction request;
  the subscribing and publishing module is configured to: when a response process corresponding to the first process type receives the repackaged interaction request, perform a subscribing response action or a publishing response action based on the repackaged interaction request; and
  the sub-database management module is configured to: when a response process corresponding to the third process type receives the repackaged interaction request, perform a state reading response action or a state switching response action based on the repackaged interaction request.

In an embodiment, the storage module is configured to: in the initialization phase, establish a process state data block of a slave-process corresponding to each data type in a preset process state list, and establish a data table corresponding to each sub-database based on a preset number of sub-databases.

In an embodiment, the sub-database management module is further configured to:
  establish a sub-database state list in the initialization phase, where the sub-database state list includes a sub-database state data block corresponding to each sub-database, and the sub-database state data block is configured to abstractly represent a state of a sub-database;
  in response to determining that the repackaged interaction request received is a state reading interaction request, determine information in the sub-database state data block of the sub-database required for the repackaged interaction request by querying the sub-database state list, and return the information to the client; and
  in response to determining that the repackaged interaction request received is a state switching interaction request, determine a to-be-switched sub-database, update, in the sub-database state list, a sub-database state data block of the to-be-switched sub-database, and after updating the sub-database state data block, send an instruction for switching the sub-database to the storage module or the client interaction module.

In an embodiment, an inter-process communication channel is maintained between the client interaction module and the subscribing and publishing module, between the client interaction module and the storage module, and between the client interaction module and the sub-database management module.

In an embodiment, the client includes at least one of a local client or a remote client; and the client interaction module is further configured to:
  establish a client state list in the initialization phase, where the client state list includes a client state data block, and the client state data block is configured to represent state information of the client; and
  when receiving the interaction request from the client, query the client state list, and when the client state list does not include the client sending the interaction request, establish a client state data block of the client in the client state list.

In an embodiment, the client interaction module is further configured to: periodically determine whether a client is out-of-connection, and when a client is out-of-connection, inform the subscribing and publishing module, the storage module, and the sub-database management module.

In an embodiment, the interaction request carries a name of an interaction instruction and parameters:
the client interaction module is further configured to:
establish an interaction instruction list in the initialization phase, where the interaction instruction list stores names of interaction instructions and processing templates associated with the names of the interaction instructions, and the processing templates each includes a response process start interface, a package interface, and a send interface; and
based on the name of the interaction instruction obtained by analyzing the interaction request, query the interaction instruction list to obtain a processing template, and call a response process start interface for determining whether a response process is started, and when the response process is not started, start the response process and establish an inter-process communication channel.

In an embodiment, the client interaction module is further configured to: repackage the interaction request by the package interface, and send the repackaged interaction request to the response process by the send interface.

In an embodiment, the subscribing and publishing module is further configured to:
establish a subscription information list in the initialization phase, where the subscription information list includes a subscription information data block, and the subscription information data block includes a subscription client descriptor, subscription channel information, a subscription message label and a message buffer;
establish and/or update the subscription information data block in the subscription information list when a subscription interaction request is received; and
traverse the subscription information list, fill the message buffer based on the subscription channel information in the subscription information list, and send information in the message buffer to the client by the subscription client descriptor, when a publishing interaction request is received.

In an embodiment, the process state data block includes a process descriptor, an inter-process communication descriptor, a process state label bit, and a data transmission buffer.

According to a second aspect of embodiments of the present disclosure, there is provided a data processing method, performed by a server, and including:
receiving an interaction request sent by a client;
analyzing the interaction request to obtain an analyzing result;
based on the analyzing result, determining a process type to be started and starting a response process of the process type;
repackaging the interaction request and sending the repackaged interaction request to the response process, where the process type includes a first process type, a second process type and a third process type; starting a slave-process corresponding to each data type in an initialization phase; when a response process corresponding to the second process type receives the repackaged interaction request, determining a data type of data to be processed by the repackaged interaction request as a target data type based on the repackaged interaction request, and forwarding the repackaged interaction request to a slave-process corresponding to the target data type to cause the slave-process to perform data query or data storage based on the repackaged interaction request; when a response process corresponding to the first process type receives the repackaged interaction request, performing a subscribing response action or a publishing response action based on the repackaged interaction request; and when a response process corresponding to the third process type receives the repackaged interaction request, performing a state reading response action or a state switching response action based on the repackaged interaction request.

In an embodiment, the client includes at least one of a local client or a remote client, and the method further includes:
establishing a client state list in the initialization phase, where the client state list includes a client state data block, and the client state data block is configured to represent state information of the client; and
when receiving the interaction request from the client, querying the client state list, and when the client state list does not include the client sending the interaction request, establishing a client state data block of the client in the client state list.

In an embodiment, the method further includes:
periodically determining whether a client is out-of-connection.

In an embodiment, the interaction request carries a name of an interaction instruction and parameters; and the method further includes:
establishing an interaction instruction list in the initialization phase, where the interaction instruction list stores names of interaction instructions and processing templates associated with the names of the interaction instructions, and the processing templates each includes a response process start interface, a package interface, and a send interface; and
based on the analyzing result, determining a process type to be started and starting a response process of the process type includes:
based on the name of the interaction instruction obtained by analyzing the interaction request, querying the interaction instruction list to obtain a processing template, and calling a response process start interface for determining whether a response process is started, and when the response process is not started, starting the response process and establishing an inter-process communication channel.

In an embodiment, the method further includes: in the initialization phase, establishing a process state data block of a slave-process corresponding to each data type in a preset process state list, and establishing a data table corresponding to each sub-database based on a preset number of sub-databases.

In an embodiment, the method further includes:
establishing a sub-database state list in the initialization phase, where the sub-database state list includes a sub-database state data block corresponding to each sub-database, and the sub-database state data block is configured to abstractly represent a state of a sub-database;
in response to determining that the repackaged interaction request received is a state reading interaction request, determining information in the sub-database state data block of the sub-database required for the repackaged interaction request by querying the sub-database state list, and returning the information to the client; and
in response to determining that the repackaged interaction request received is a state switching interaction request, determining a to-be-switched sub-database, and updating, in the sub-database state list, a sub-database state data block of the to-be-switched sub-database.

In an embodiment, the method further includes:

establishing a subscription information list in the initialization phase, where the subscription information list includes a subscription information data block, and the subscription information data block includes a subscription client descriptor, subscription channel information, a subscription message label and a message buffer;

establishing and/or updating the subscription information data block in the subscription information list when a subscription interaction request is received; and traversing the subscription information list, filling the message buffer based on the subscription channel information in the subscription information list, and sending information in the message buffer to the client by the subscription client descriptor, when a publishing interaction request is received.

According to a third aspect of embodiments of the present disclosure, there is provided a non-transitory computer readable storage medium, storing computer programs thereon, where the computer programs, when executed by a processor, cause the processor to perform the above-mentioned method.

According to a fourth aspect of embodiments of the present disclosure, there is provided an electronic device, including: a processor; and a memory storing computer programs executable by the processor, where the processor is configured to, when executing the computer programs, perform the above-mentioned method.

BRIEF DESCRIPTION OF THE DRAWINGS

The accompanying drawings are used to help further understanding of the present disclosure and constitute a part of the present description. The illustrative embodiments and its descriptions are used to explain the present disclosure without constituting limitation to the present disclosure.

DETAILED DESCRIPTION OF THE EMBODIMENTS

In order to make the object, technical solutions and advantages of the present disclosure clearer, the technical solutions of embodiments of the present disclosure will be described clearly and fully below in combination with the embodiments and corresponding drawings in the present disclosure. It is apparent that the described embodiments are merely some of embodiments of the present disclosure rather than all embodiments. Other embodiments obtained by those of ordinary skill in the art based on the embodiments in the present disclosure without making creative work shall all fall into the scope of protection of the present disclosure.

The technical solutions provided by the embodiments of the present disclosure will be detailed below in combination with drawings.

According to the embodiments of the present disclosure, a data processing system is provided. The system includes a client interaction module, a subscribing and publishing module, a storage module, and a sub-database management module, as shown in FIG. 1.

Figures 1, 2:
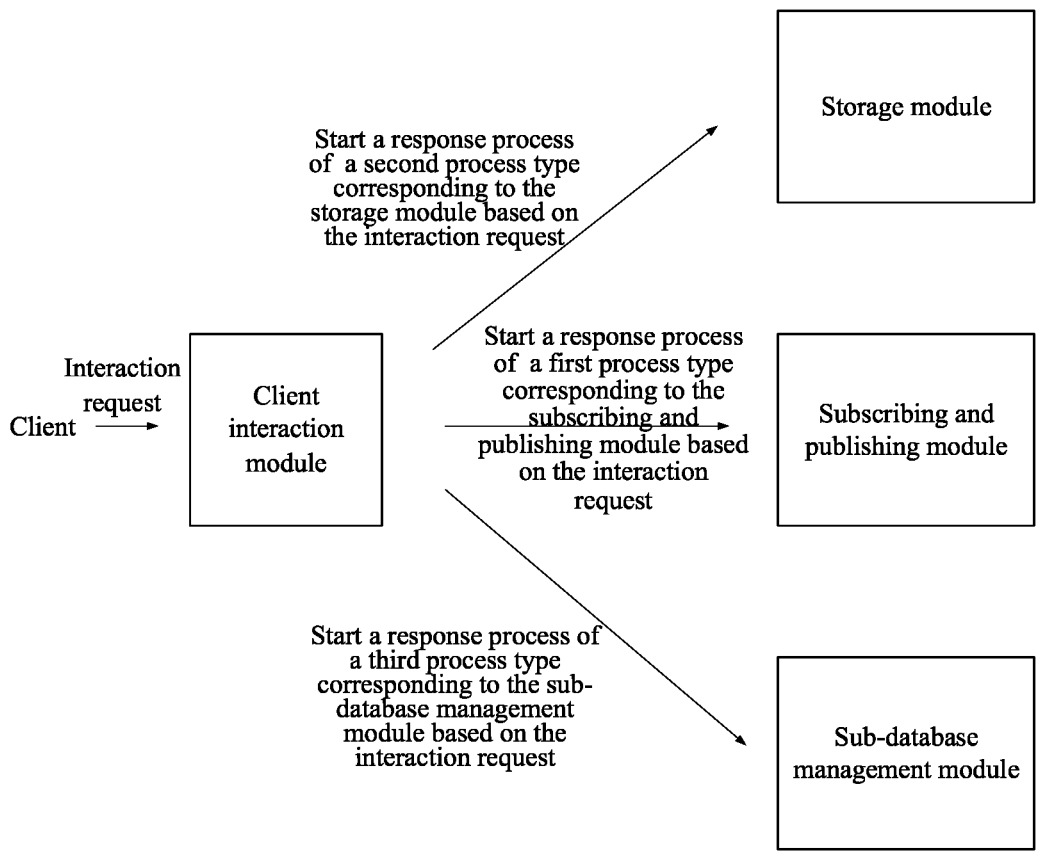
FIG. 1 is a structural schematic diagram illustrating a data processing system according to an embodiment of the present disclosure.
FIG. 2 is a logical schematic diagram illustrating a client interaction module according to an embodiment of the present disclosure.

FIG. 1 is a structural schematic diagram illustrating a data processing system according to an embodiment of the present disclosure.

Based on the above-mentioned data processing system, the client interaction module may be configured to, start and listen to a specific port or address, receive an interaction request sent by a client, analyze the interaction request to obtain an analyzing result, and based on the analyzing result, determine a process type to be started and start a response process of the process type, and repackage the interaction request and send the repackaged interaction request to the response process. The process type includes a first process type corresponding to the subscribing and publishing module, a second process type corresponding to the storage module and a third process type corresponding to the sub-database management module.

That is, the client interaction module is used to receive the interaction request from each client to determine the needs of the client, and the above-mentioned analyzing result can indicate which type of request is the interaction request sent by the client, so that it can be determined based on the interaction request, which module (the storage module, the sub-database management module, or the subscribing and publishing module) should handle the functionality needs expressed by the client through the interaction request. As a result, the analyzing result can determine whether the response process required to execute the interaction request is a response process of the second process corresponding to the storage module, a response process of the third process corresponding to the sub-database management module, or a response process of the first process corresponding to the subscribing and publishing module.

Since the interaction request carries a name of an interaction instruction and parameters (the parameters are required parameters other than the interaction instruction), the name of the interaction instruction and the names of the parameters in the interaction request can be determined based on the analyzing result. Since the client interaction module analyze the interaction request after receiving it, the interaction request needs to be repackaged when forwarding it to each of other modules.

It is to be noted that since each of the modules may be written in different programming languages, then the transmission protocols between the modules may also be different, and the client interaction module needs to repackage the interaction request in accordance with the protocols between the modules corresponding to the response process to send the repackaged interaction request to this response process.

And then, the interaction request sent by the client needs to be processed by the response process of the corresponding module, and the corresponding response process can be started. When the response process of the module that needs to execute the interaction request has already been started, the repackaged interaction request can be directly sent to the response process.

This embodiment aims to implement a multi-process redis-like database with redis instruction-line compatibility. Unlike most solutions, which use a slave-process mechanism (fork), i.e., fork a slave-process for each client, this embodiment is described below:

The client interaction module of this embodiment can use linux socket technology as well as I/O multiplexing technology, similar to a redis server. This embodiment can bind a local ip address (or address 127.0.0.1) to a specific port (by default, port 6379 is used so as to be consistent with redis), and on the other hand, it can also bind a local uniplexed information and computering system (UNIX) domain address. The UNIX domain address can be fixed in the code, or it can be uploaded as a parameter or configuration file information to the client interaction module. When the address is bound, the corresponding socket descriptor can be added to the linux interface in the I/O multiplexing technology, and the interface may be select, poll or epoll, and most linux environments support the I/O multiplexing interface, which ensures the generality of this embodiment.

The storage module is configured to: start a slave-process corresponding to each data type in an initialization phase. When a response process corresponding to the second process type receives the repackaged interaction request, determine a data type of data to be processed by the repackaged interaction request as a target data type based on the repackaged interaction request, and forward the repackaged interaction request to a slave-process corresponding to the target data type to cause the slave-process to perform data query or data storage based on the repackaged interaction request.

The subscribing and publishing module is configured to: when a response process corresponding to the first process type receives the repackaged interaction request, perform a subscribing response action or a publishing response action based on the repackaged interaction request.

The sub-database management module is configured to: when a response process corresponding to the third process type receives the repackaged interaction request, perform a state reading response action or a state switching response action based on the repackaged interaction request.

An inter-process communication channel is maintained between the client interaction module and the subscribing and publishing module, between the client interaction module and the storage module, and between the client interaction module and the sub-database management module to facilitate communication between the client interaction module and each of the other modules.

That is, in the data processing system of the present disclosure, the originally tightly coupled functions of storage, subscribing-publishing, and sub-database management in the database service are differentiated and divided into individual modules, each of the modules independently receives the repackaged interaction requests sent by the client interaction module, such that each of the modules is an independent process.

Moreover, since each of the modules is an independent process from each other, it is also possible to implement different modules by different programming languages, so that a suitable programming language can be used to implement a module in accordance with the characteristics of the module.

The above-mentioned clients include local and/or remote clients.

The client interaction module herein may establish a client state list in the initialization phase, and the client state list includes a client state data block, and the client state data block is configured to represent state information of the client. The client state data block may include information about whether the client is online, information about the time of the last interaction with the client, information about the content (e.g., what the client's sent interaction request (e.g., what the interaction request sent by the client is), etc.

When an interaction request is received from a client, the client state list may be queried. When the client state list does not include the client sending the interaction request, a client state data block of the client is established in the client state list.

Whether a client is out-of-connection is periodically determined, and when a client is out-of-connection, the subscribing and publishing module, the storage module, and the sub-database management module can be informed. When the client supported by any of the subscribing and publishing module, the storage module, or the sub-database management module is out-of-connection, the corresponding module may temporarily end the process (response process), i.e., when the clients for which a module is required to provide functionality are all out-of-connection, the module does not need to work for the time being, and in order to conserve resources, the module may end the process. When there are clients that require the functionality of the module, the client interaction module can actively start the response process of this module.

FIG. 2 is a logical schematic diagram illustrating a client interaction module according to an embodiment of the present disclosure.

Specifically, referring to FIG. 2, this embodiment can implement the client interaction module in C programming language, and the client interaction module can actually be implemented in any programming language such as python, go programming language, and so on, and it only needs to support linux basic sockets and I/O multiplexing interfaces.

Where client_info_s*client_info_list[MAX_CLIENT_NUM] indicates that each client state data block (client_info_s) in the client state list (client_info_list) is of type client_info_s structure, and MAX_CLIENT_NUM indicates the maximum number of client state data blocks contained in the client state list.

A client_info_list[0] is a first client state data block in the client state list, and a client_info_list[1] is a second client state data block in the client state list.

The form of the client_info_s structure can be specified as shown in the following example:

```
#typedefine clientinfo
{
int fd;
unsigned long cnt;
...
}client_info_s;
``` where "#typedefine clientinfo { . . . } client_info_s;" is a keyword in the C programming language used to define the above structure type, "fd" is a socket descriptor used to represent a channel (inter-process communication channel) identifier for communication between a client and a client interaction module, and "cnt" is a heartbeat counter used to represent a number of client accesses to the database.

This embodiment is relatively functionally concise and only implements the basic functions of the database, thus only two elements (the socket descriptor "fd" and the heartbeat counter "cnt") are listed herein, and other elements can exist in the client state data block in practical applications. The data structure for client_info_s structure list can be implemented in a variety of ways, also depending on the specific development language.

For example, redis is developed in C programming language, and adopts a chained table data structure for the client state list. This embodiment does not need to set input/output buffers and so on in the client_info_s structure, and thus a series of corresponding label bits can be omitted, and an array can be used to realize the client state list. Even "fd" can be directly set as subscript of an array, which can be accessed at the fastest speed. Since only pointers are stored in the array; the waste of memory space is also limited. Moreover, if the client interaction module is implemented by using python, C++, go programming languages, etc., the above-mentioned programming languages support more complex data structures such as dictionaries and containers, but the corresponding business code will be more concise, which is also an advantage of the method in the present disclosure.

The storage module, in the initialization phase, needs to establish a process state data block of a slave-process corresponding to each data type in a preset process state list, and establish a data table corresponding to each sub-database based on a preset number of sub-databases. The preset number of sub-databases herein can be preset artificially, for example, the storage module can maintain 16 sub-databases, and establish data tables under these 16 sub-databases. The process state data block herein may include a process descriptor, an inter-process communication descriptor, a process state label bit, and an identifier of a message buffer.

The process descriptor may refer to a pid of the process, which uniquely identifies the process. The inter-process communication descriptor is a socket "fd", which is used to identify a channel for inter-process communication. The process state label bit is a variable, which is used in this embodiment to identify whether the process is online. The inter-process communication buffer is used to cache data for inter-process communication.

Figure 3:
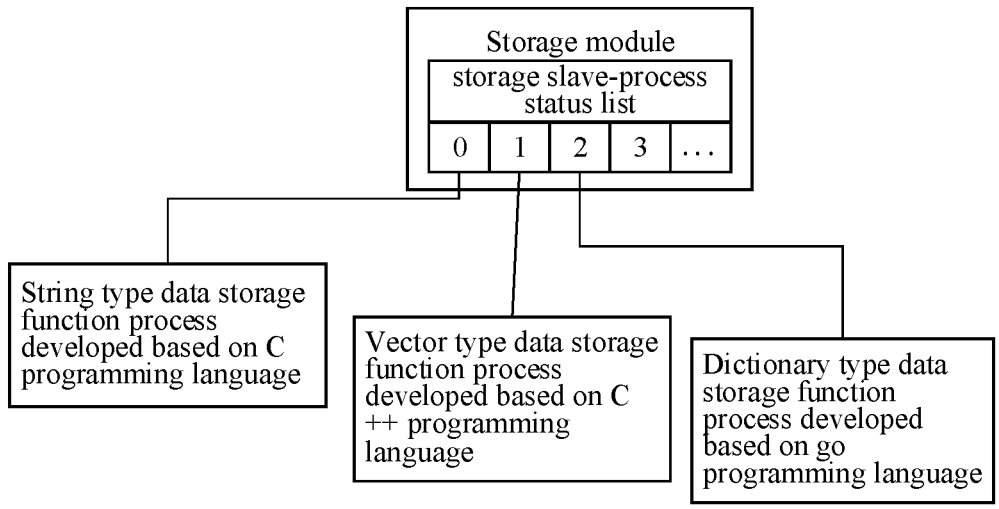
FIG. 3 is a schematic diagram illustrating a process state list according to an embodiment of the present disclosure.

FIG. 3 is a schematic diagram illustrating a process state list according to an embodiment of the present disclosure.

Specifically, with reference to FIG. 3, the storage module may maintain a process state list (storage slave-process state list). The slave-process corresponding to each data type is named using "slave" instead of "child", which actually highlights the concept of master-slave, i.e., in this embodiment, the slave-processes for each data type is not generated by the storage module by establishing a fork but are started simultaneously during the system initialization phase, with only in a logical master-slave relationship. In the initialization phase, various processes are started simultaneously, and the hypervisor technology can be used, without further explanation.

Each process state data block in the above process state list can specifically be defined in the following form:

```
#typedefine store_slave process_info
{
char name[8];
int fd;
```

```
unsigned int buf_len;
void *buf;
...
}store_slave_process_info_s;
``` where "#typedefine store_slave_process_info { . . . } store_slave_process_info_s:" is a keyword in C programming language used to define the above structure type, "name" can be an identifier of a data type corresponding to a slave-process, socket "fd" can represent an identifier (inter-process communication descriptor) of an inter-process communication channel between the slave-process and the storage module, "void*buf" is used to represent an address of a message buffer corresponding to the inter-process communication channel, and "buf_len" is used to represent a size of the message buffer.

After receiving a storage instruction from the client interaction module, the storage module can determine a data type of a storage object to be operated, and then obtain the "fd" and the message buffer of the corresponding slave-process by querying the process state list, construct the interaction instruction and send it to the slave-process.

The development method of the slave-process further reflects the decoupling and flexibility brought by the present disclosure, for the pure character type data, it is possible to use C programming language for development, while for the vector, a dictionary and other data structures which are not supported by C programming language, the solution of redis and so on is to develop the corresponding module based on C programming language additionally, in a result, the database developer needs to bear the additional workload. Moreover, after the corresponding vector and dictionary data structure related technologies are updated and iterated, additional time and effort need to be spent to follow up. For example, the hash algorithm of the dictionary data structure in redis has undergone multiple iterations and evolution. The solution can be developed based on a native development language that supports the corresponding data structure. By synchronously upgrading development tools or language packs, the development of corresponding technologies can be followed up. Therefore, for the subprocess corresponding to a data type, it can be developed by a programming language suitable for the data type.

The sub-database management module can establish a sub-database state list during the initialization phase, which includes a corresponding sub-database state data block of each sub-database. The sub-database state data block is used to abstract represent the state of the sub-database. The sub-database state data block herein can include the active information (whether the sub-database is an active state), resource state, key space, etc. of the sub-database.

If the sub-database management module determines that the repackaged interaction request received is a state reading interaction request, the sub-database management module can determine the sub-database state data block required for the repackaged interaction request by querying the sub-database state list and return the sub-database state data block to the client.

If the sub-database management module determines that the repackaged interaction request received is a state switching interaction request, the sub-database management module can determine a to-be-switched sub-database and update a sub-database state data block of the to-be-switched sub-database in the sub-database state list. After updating the sub-database state data block, the sub-database management module can send an instruction for switching the sub-database to the storage module or the client interaction module.

The above sub-database management module is mainly used to manage the state of each sub-database. The data processing system in the present disclosure can include multiple sub-databases. Moreover, the storage module in the data processing system can only operate on one or some of the sub-databases.

Active information in the sub-database state data block can represent the state of the sub-database. For example, the state of the sub-database can be active or inactive. The active state can indicate that the sub-database is a sub-database that the storage module can handle, and the inactive state can indicate that the sub-database is not a sub-database that the current storage module can handle.

When the sub-database management module receives a state switching interaction request, the sub-database management module can determine the sub-database that needs to be switched to an active state, update the sub-database state data block of the sub-database to the active state, and send an instruction for switching the sub-database to the storage module or the client interaction module, such that the storage module can switch to the sub-database for a subsequent operation on the sub-database, or the client interaction module can inform the storage module to switch to the sub-database.

In the general database technology, a database server can often provide more than one sub-database. For example, redis can provide 16 sub-databases by default, and corresponding instructions can be used to switch between different databases. In this embodiment, the sub-database management module is used to implement the corresponding functions. The sub-database management module is decoupled as an independent process, which is very beneficial for the functional expansion of the database.

Figure 4:
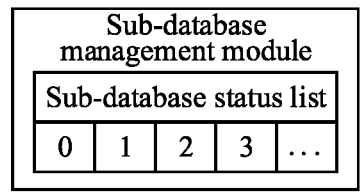
FIG. 4 is a structural schematic diagram illustrating a sub-database management module according to an embodiment of the present disclosure.

FIG. 4 is a structural schematic diagram illustrating a sub-database management module according to an embodiment of the present disclosure.

The design of the sub-database state list can be referred to several of the above-mentioned modules, with specific reference to FIG. 4. The sub-database state data block in the sub-database state list can be defined in the following form:

```
#typedefine child_db_manage_info
{
int active;
int fd[MAX_NUM];
...
}child_db_manage_info_s;
``` where "#typedefine child_db_manage_info{ . . . } child_db_manage_info_s:" is a keyword in C programming language, which is used to define the above structure type, "active" can represent active information of the sub-database, and "fd[MAX_NUM]" can represent an inter-process communication descriptor (identifier of the inter-process communication channel) in the sub-database management module.

When the sub-database management module receives an instruction such as switching a sub-database, the sub-database management module can query the sub-database state data block corresponding to the relevant sub-database in the sub-database state list, update information such as active in the sub-database state data block, and send a message to the storage module via the inter-process communication descriptor "fd".

Since a sub-database may contain data of different data types, the above "fd[MAX_NUM]" may be the descriptor of the inter-process communication channel corresponding to multiple data types, and the message related to a data type may be sent through the inter-process communication channel corresponding to the data type, and the storage module, after receiving the message, may perform the corresponding action according to the specific business requirements. After receiving the message, the storage module can execute the corresponding action according to the specific business requirements.

The client interaction module may, in the initialization phase, establish an interaction instruction list. The interaction instruction list stores names of interaction instructions and processing templates associated with the names of the interaction instructions, and the processing templates each includes a response process start interface, a package interface, and a send interface.

Based on the name of the interaction instruction obtained by analyzing the interaction request, the interaction instruction list is queried to obtain a processing template, and a response process start interface for determining whether a response process is started is called. When the response process is not started, the response process is started, and an inter-process communication channel between the client interaction module and the response process is established.

Figure 5:
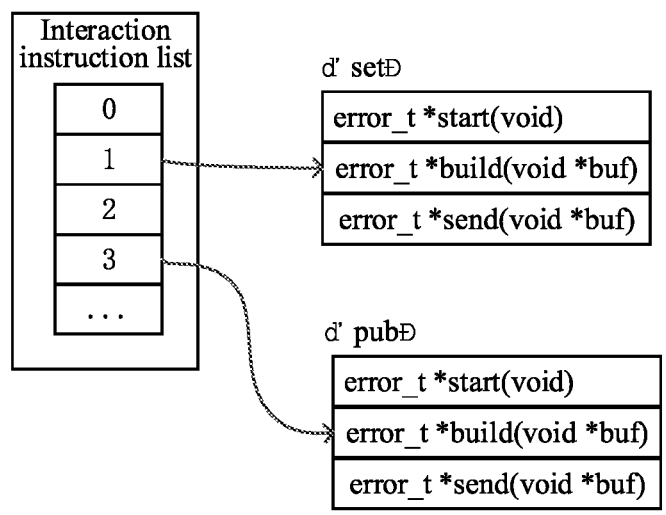
FIG. 5 is a schematic diagram illustrating an interaction instruction list according to an embodiment of the present disclosure.

FIG. 5 is a schematic diagram illustrating an interaction instruction list according to an embodiment of the present disclosure.

Referring to FIG. 5, in this embodiment, the interaction instruction list is realized by using a hash table. This embodiment aims to be compatible with redis instruction-line interface, so the interaction instructions are packaged by using a redis serialization protocol (RESP), about which there are many references, without repeating herein.

In short, the name of the interaction instruction can be obtained through format analyzing based on the RESP, such as "set" or "pub". "Set" can refer to an instruction to "save data", and "pub" can refer to an instruction to "publish information".

A hash operation is then performed based on these names, and the resulting hash value is a position in the array where the interaction instruction is located. The array holds pointers to the structure that handles interaction instructions. The structure defines a start interface (process start interface), a build interface (package interface), and a send interface, which are used to start the response process, repackage the interaction request, and send the interaction request to the response process.

In FIG. 5, "error_t*start(void)" represents the start interface (interface used to start the response process), "error_t*build(void*buf)" represents the build interface (interface used to repackage the request), and "error_t*send (void*buf)" represents the send interface (interface used to send the interaction request to the responding process).

In general, only one handle interface is packaged as a response to the message. According to this method, the handle interface is divided into three interfaces (start interface, build interface, and send interface), mainly for polymorphism, that is, for different interaction instructions, using the same name of operation can produce different effects. A developer can complete the registration of interface in the initialization phase of the program according to the needs of specific businesses.

The design conditions of this embodiment are such that certain response processes are started only when a response request is first received. For example, when the client interaction module does not receive a subscribing-publishing type of interaction request message, all processes of the subscribing and publishing module do not have to be started. When the clients that need subscribing and publishing are offline, the subscribing and publishing module will shut down its processes based on the obtained messages from the client interaction module. The above allows the entire database service to run only the necessary processes, thus saving overall resources and improving the efficiency of response to interaction requests.

The above-mentioned package interface can be used to repackage the interaction request, and the send interface can send the repackage interaction request to the response process that needs to process the repackaged interaction request.

The subscribing and publishing module is mainly configured to process the subscribing type of interaction request or the publishing type of interaction request. Since the database in the present disclosure may be a redis database, and the redis database provides subscribing and publishing functionality: the subscribing and publishing module in the present disclosure is mainly configured to support the subscribing and publishing functionality.

Specifically: the subscribing and publishing module may establish a subscription information list in the initialization phase. The subscription information list includes a subscription information data block, and the subscription information data block includes a subscription client descriptor, subscription channel information, a subscription message label and a message buffer. The subscription information data block is used to represent a channel subscribed by a client. The subscription client descriptor represents an identification of the client. The subscription channel information represents the channel subscribed by the client. The subscription message label represents a message required by the client to be sent in the channel subscribed by the client. The message buffer is used to cache messages.

The subscribing and publishing module may establish and/or update the subscription information data block in the subscription information list when a subscription interaction request is received.

The subscribing and publishing module can traverse the subscription information list, fill the message buffer based on the subscription channel information in the subscription information list, and send information in the message buffer to the client by the subscription client descriptor, when a publishing interaction request is received.

The subscribing-publishing function refers to the embodiment of the relevant "sub" and "pub" instructions in the redis database, where subscription is performed when the client sends the "sub" instruction, and subscription is performed in units of channels. For example, the client sends "subscribe channel_name", which indicates that the client subscribes a channel named "channel_name"; another client sends publish channel_name "message . . . ", and the corresponding subscription client will receive the message.

There have been many feasible cases in the industry for separate subscribing and publishing functions, and one reference case can be found in an invention patent titled an IoT device collaborative linkage method and device, which also adopts the embodiment of subscribing and publishing. The specific principle is to use a dictionary and other data structures to design a subscription information list, a channel name and subscription information stored in the list. Compared to the subscribing and publishing functions of databases such as redis, this embodiment has the biggest difference is that the subscribing and publishing module as an independent process to run. Redis is only developed in C programming language, and the C programming language does not support a dictionary data structure, and therefore redis is developed only in C programming language, which does not support a dictionary data structure, thus redis additionally implements the management of the dictionary data structure in C programming language, which increases the workload of development and maintenance. The present embodiment can be developed by using programming languages such as go programming language, python and other programming languages that support the dictionary structure.

Moreover, this embodiment can also adopt the technology of inter-process socket descriptor transmission of linux. Specifically, the client interaction module will send the client socket descriptor of the subscription request to the subscribing and publishing module when the client interaction module receives the subscription interaction request instruction, so that the subscribing and publishing module does not need to go through the relay of the client interaction module when it needs to send a message, and can directly send the message to the client in accordance with the client socket descriptor, such that a intermediate process is avoided, and program errors and loopholes are thus reduced, and it is also easy to maintain and extend, which once again reflects the advantages of decoupled functionality.

Figure 6:
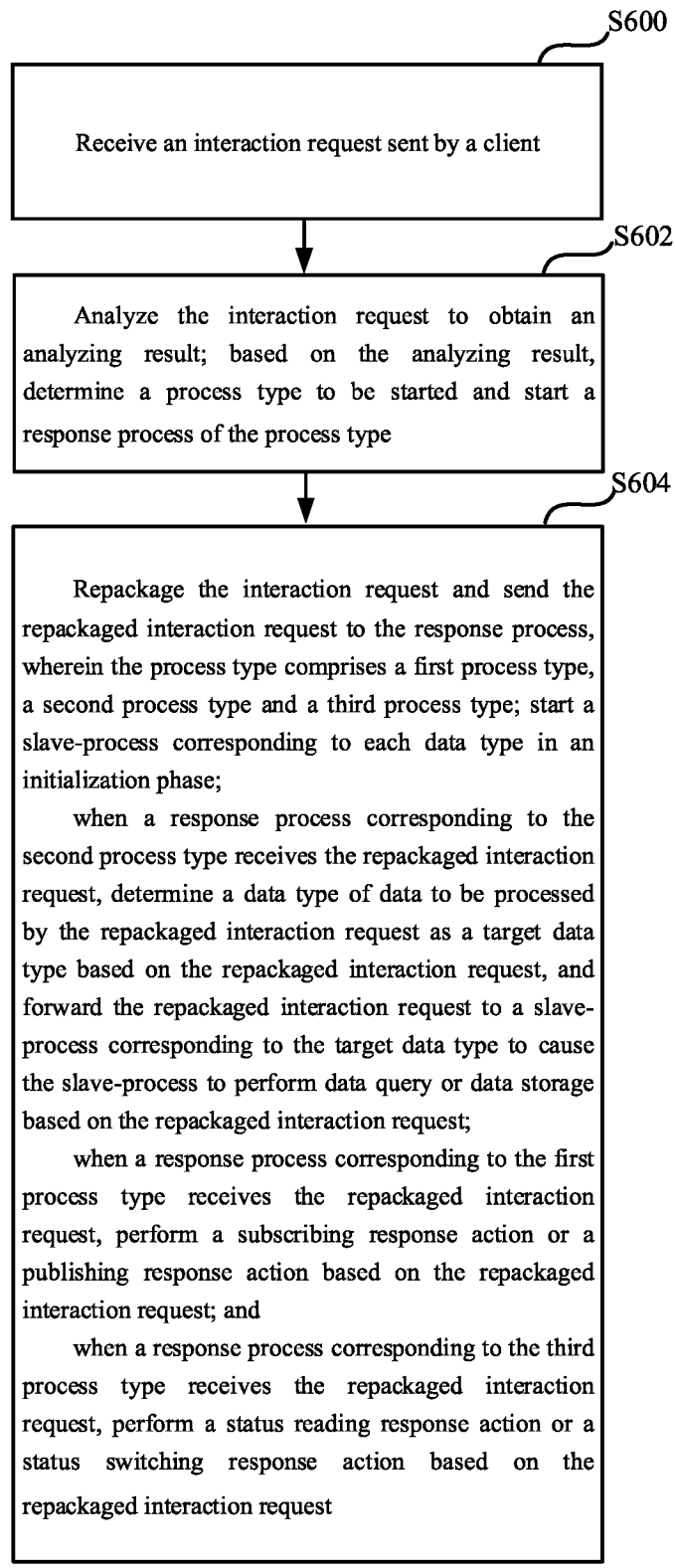
FIG. 6 is a flowchart illustrating a data processing method according to an embodiment of the present disclosure.

Based on the above-mentioned data processing system, similarly, the present disclosure also provides a data processing method, as shown in FIG. 6.

FIG. 6 is a flowchart illustrating a data processing method according to an embodiment of the present disclosure. The method is performed by a server and includes the following steps S600 to S604:

At S600, an interaction request sent by a client is received.

At S602, the interaction request is analyzed to obtain an analyzing result; and based on the analyzing result, a process type to be started is determined to start a response process of the process type.

At S604, the interaction request is repackaged, and the repackaged interaction request is sent to the response process, where the process type includes a first process type, a second process type and a third process type: a slave-process corresponding to each data type is started in an initialization phase: when a response process corresponding to the second process type receives the repackaged interaction request, a data type of data to be processed by the repackaged interaction request is determined as a target data type based on the repackaged interaction request, and the repackaged interaction request is forwarded to a slave-process corresponding to the target data type to cause the slave-process to perform data query or data storage based on the repackaged interaction request: when a response process corresponding to the first process type receives the repackaged interaction request, a subscribing response action or a publishing response action is performed based on the repackaged interaction request; and when a response process corresponding to the third process type receives the repackaged interaction request, a state reading response action or a state switching response action is performed based on the repackaged interaction request.

In the embodiments of the present disclosure, the client includes at least one of a local client or a remote client.

The method further includes:
establishing a client state list in the initialization phase, where the client state list includes a client state data block, and the client state data block is configured to represent state information of the client; and when receiving the interaction request from the client, querying the client state list, and when the client state list does not include the client sending the interaction request, establishing a client state data block of the client in the client state list.

In the embodiments of the present disclosure, the method further includes:

periodically determining whether a client is out-of-connection.

In the embodiments of the present disclosure, the interaction request carries a name of an interaction instruction and parameters. The method further includes:

establishing an interaction instruction list in the initialization phase, where the interaction instruction list stores names of interaction instructions and processing templates associated with the names of the interaction instructions, and the processing templates each includes a response process start interface, a package interface, and a send interface; and based on the analyzing result, determining a process type to be started and starting a response process of the process type includes:

based on the name of the interaction instruction obtained by analyzing the interaction request, querying the interaction instruction list to obtain a processing template, and calling a response process start interface for determining whether a response process is started, and when the response process is not started, starting the response process and establishing an inter-process communication channel.

In the embodiments of the present disclosure, the method further includes: in the initialization phase, establishing a process state data block of a slave-process corresponding to each data type in a preset process state list, and establishing a data table corresponding to each sub-database based on a preset number of sub-databases.

In the embodiments of the present disclosure, the method further includes:

establishing a sub-database state list in the initialization phase, where the sub-database state list includes a sub-database state data block corresponding to each sub-database, and the sub-database state data block is configured to abstractly represent a state of a sub-database:

in response to determining that the repackaged interaction request received is a state reading interaction request, determining information in the sub-database state data block of the sub-database required for the repackaged interaction request by querying the sub-database state list, and returning the information to the client; and in response to determining that the repackaged interaction request received is a state switching interaction request, determining a to-be-switched sub-database, and updating, in the sub-database state list, a sub-database state data block of the to-be-switched sub-database.

In the embodiments of the present disclosure, the method includes:

establishing a subscription information list in the initialization phase, where the subscription information list includes a subscription information data block, and the subscription information data block includes a subscription client descriptor, subscription channel information, a subscription message label and a message buffer;

establishing and/or updating the subscription information data block in the subscription information list when a subscription interaction request is received; and traversing the subscription information list, filling the message buffer based on the subscription channel information in the subscription information list, and sending information in the message buffer to the client by the subscription client descriptor, when a publishing interaction request is received.

The data processing method provided in the present disclosure is identical to the specific embodiments of the above-mentioned data processing system, without repeating herein.

The data processing system and method provided by the present disclosure can achieve complete decoupling between various modules based on a process package construction. The inter-process communication can ensure the consistency of the interfaces between modules, and based on the popularity of modern computers with multiple cores, the multi-process construction model does not cause serious performance loss while realizing the advantages of decoupling. Also, the decoupling of the modules makes the client interaction, subscribing and publishing, storage and sub-database management and other core functions can be developed completely independently with the development of multi-language, multi-construction and multi-mode development. Each module can choose the most suitable development language, program construction, and design pattern based on its own characteristics, such that the problem of traditional databases having to make compromises to balance the characteristics of each module is thus avoided (traditional database systems are often written in the same programming language). The decoupled model based on process package also provides the possibility of independent deployment, independent debugging, and independent maintenance of individual modules, and the core modules such as client interaction, subscribing and publishing, storage, and sub-database management are not even unnecessarily deployed on a single host/server, and each module can also be debugged and maintained completely independent of other modules through fixed interfaces. Compared with the related art, it is possible to solve the problems of high coupling of modules within the database, insufficient flexibility and scalability, and difficult maintenance, thus the execution efficiency of the database is improved.

The present disclosure provides a computer readable storage medium, storing computer programs thereon, where the computer programs, when executed by a processor, cause the processor to perform the above-mentioned data processing method.

Figure 7:
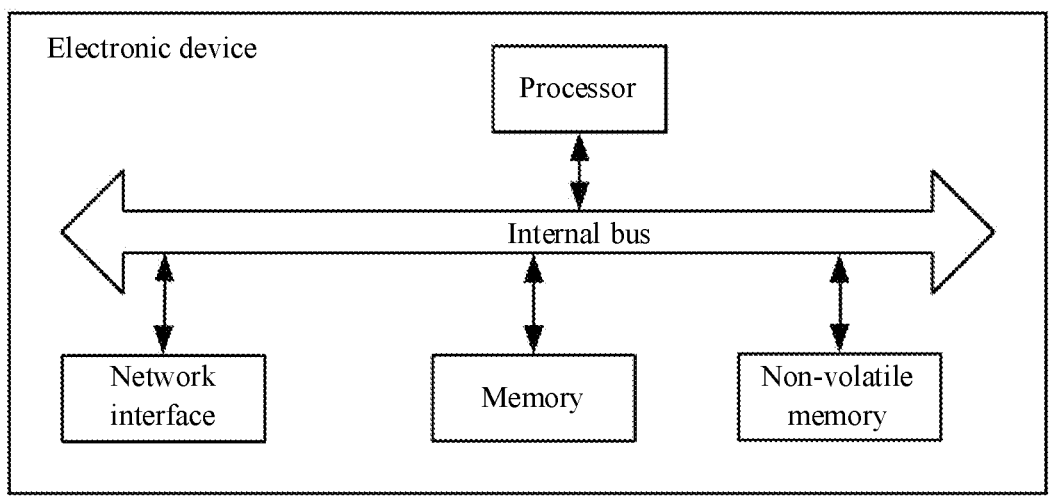
FIG. 7 is a schematic diagram illustrating an electronic device corresponding to FIG. 6 according to an embodiment of the present disclosure.

The present disclosure further provides a structural schematic diagram illustrating an electronic device shown in FIG. 7. As shown in FIG. 7, from hardware level, the electronic device includes a processor, an internal bus, a network interface, a memory and a non-volatile memory and may also include hardware required by other services. The processor reads corresponding computer programs from the non-volatile memory into the memory for running so as to achieve the above-mentioned data processing method.

Of course, in addition to software implementation, the present disclosure does not preclude other implementations, for example, logic device or combination of software and hardware or the like. The execution subject for the above processing flows is not limited to each logic unit and may also be hardware or logic device.

In 1990's, whether one technical improvement is a hardware improvement (e.g., improvement on diode, transistor, switch and other circuit structures) or a software improvement (improvement on method flow) can be obviously determined. But, along with technological development, many improvements on method flows at present have been regarded as direct improvements for hardware circuit structures. Almost all of the designers program an improved method flow into a hardware circuit to obtain a corresponding hardware circuit structure. Therefore, it cannot be said that one improvement on method flow cannot be achieved by hardware entity modules. For example. Programmable Logic Device (PLD) (e.g. Field Programmable Gate Array (FPGA)) is such a integrated circuit, the logic function of which is determined by the programming of the user for the device. The designers can integrate one digital system into one sheet of PLD by programming, without requesting the chip manufacturers to design and manufacture a dedicated integrated circuit chip. Furthermore, nowadays, replacing the hand preparation of the integrated circuit chip, the programming is mostly achieved by "logic compiler" software, which is similar to the software compiler for development and drafting the programs. But, for compiling the previous original codes, a specific programming language is to be used, which is called Hardware Description Language (HDL). The HDL includes not only one type but multiple, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL) and the like. The mostly common at present are Very-High-Speed Integrated Circuit Hardware Description Language (VHDL) and Verilog. Those skilled in the arts should understand that as long as logic programming on the method flow and programming to the integrated circuit are performed using the above several hardware description languages, the hardware circuit for implementing the logic method flow can be easily obtained.

The controller can be implemented in any proper way, for example, the controller may determine the form of, for example, microprocessor, or processor, or computer readable medium storing computer readable program codes (e.g., software or firmware) executable on the (micro) processor, logic gate, switch. Application Specific Integrated Circuit (ASIC), programmable logic controller and embedded microcontroller. The examples of the controller may include but not limited to the following microcontrollers: ARC 625D, Atmel AT91SAM, Microchip PIC18F26K20 and Silicone Labs C8051F320, and the memory controller may also be implemented as a part of the control logic of the memory. Those skilled in the art also understand that, in addition to implementing the controller by pure computer readable program codes, logic programming may be performed on the method steps to enable the controller to achieve the same functions in the form of logic gate, switch, dedicated integrated circuit, programmable logic controller and embedded microcontroller and the like. Therefore, the controllers may be regarded as one type of hardware components, and the apparatuses for performing various functions inside the controllers can also be regarded as structures in the hardware components, or, the apparatuses for performing various functions are regarded as not only software modules for performing the methods but also structures in the hardware components.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a tablet computer, wearable device, or combinations of any several devices of these devices.

For the convenience of description, the above-mentioned apparatus, when described, is divided into various units by function for descriptions. Of course, when the present disclosure is implemented, the functions of the units can be implemented in one or more software and/or hardware.

Those skilled in the art should understand that the embodiments of the present disclosure may be provided as methods, systems, or computer program products. Therefore, the present disclosure may determine the form of a pure hardware embodiment, a pure software embodiment, or an embodiment combining software and hardware. Furthermore, the embodiments of the present disclosure may determine the form of a computer program product implemented on one or more computer available storage mediums (including but not limited to disk memories, CD-ROM, optical storage devices, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processing machine, or other programmable data processing devices to produce a machine, so that the instructions executed by the processor or other programmable data processing device generate an apparatus for implementing functions specified in one or more flows in the flowchart and/or in one or more blocks in the block diagram.

These computer program instructions may also be stored in a computer readable memory capable of directing a computer or other programmable data processing device to operate in a particular manner, so that the instructions stored in the computer readable memory generate a manufactured product including an instruction apparatus, where the instruction apparatus implements the functions specified in one or more flows in the flowchart and/or one or more blocks in the block diagram.

These computer program instructions can also be loaded onto a computer or other programmable data processing device, so that a series of operating steps may be performed on the computer or other programmable device to generate computer-implemented processing, and thus instructions executed on the computer or other programmable device provide steps for implementing the function specified in one or more flows in the flowchart and/or one or more blocks in the block diagram.

In a typical configuration, the computing device may include one or more central processing units (CPU), an input/output interface, a network interface and a internal memory.

The internal memory may include a non-permanent memory in the computer readable storage medium, a random access memory (RAM) and/or non-volatile memory and the like, for example, Read Only Memory (ROM) or flash memory. The internal memory is an example of the computer readable medium.

The computer readable storage medium includes permanent, non-permanent, mobile and non-mobile media, which can realize information storage by any method or technology. The information may be computer readable instructions, data structures, program modules and other data. The examples of the computer storage medium include but not limited to: phase change random access memory (PRAM), a Static Random Access Memory (SRAM), a Dynamic Random Access Memory (DRAM), and other types of RAMs. Read-Only Memory (ROM), an Electrically-Erasable Programmable Read-Only Memory (EEPROM), a Flash Memory, or other memory technology. CD-ROM, digital versatile disc (DVD) or other optical storage, cassette type magnetic tape, magnetic disk storage or other magnetic storage device or other non-transmission medium for storing information accessible by computing devices. As defined in the present disclosure, the computer readable medium does not include transitory computer readable media such as modulated data signals or carriers.

It should be noted that the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

Persons skilled in the art shall understand that one or more embodiments of the present disclosure may be provided as methods, systems, or computer program products. Thus, one or more embodiments of the present disclosure may be adopted in the form of entire hardware embodiments, entire software embodiments or embodiments combining software and hardware. Further, one or more embodiments of the present disclosure may be adopted in the form of computer program products that are implemented on one or more computer available storage media (including but not limited to magnetic disk memory, CD-ROM, and optical memory and so on) including computer available program codes.

The present disclosure can be described in a general context of the computer executable instructions executable by the computer, for example, program module. Generally, the program module includes routine, program, object, component and data structure and the like for performing specific task or implementing a specific abstract data type. The present disclosure may also be practiced in a distributed computing environments, and in these distributed computing environments, tasks are performed by a remote processing device connected via communication network. In the distributed computing environments, the program module may be located in local or remote computer storage medium including a storage device.

Different embodiments in the present disclosure are all described in a progressive manner. Each embodiment focuses on the differences from other embodiments with those same or similar parts among the embodiments referred to each other. Particularly, since system embodiments are basically similar to the method embodiments, the system embodiments are briefly described with relevant parts referred to the descriptions of the method embodiments.

The foregoing descriptions are only embodiments of the present disclosure but not intended to limit the present disclosure. For the persons skilled in the art, various modifications and changes may be made to the present disclosure. Any modifications, equivalent substitutions, and improvements made within the spirit and principles of the disclosure shall be encompassed in the scope of protection of the present disclosure.

The invention claimed is:

1. A data processing system, comprising: a client interaction module, a subscribing and publishing module, a storage module, and a sub-database management module; wherein the client interaction module is configured to: receive an interaction request sent by a client, analyze the interaction request to obtain an analyzing result, and based on the analyzing result, determine a process type to be started and start a response process of the process type, and repackage the interaction request and send the repackaged interaction request to the response process, wherein the process type comprises a first process type corresponding to the subscribing and publishing module, a second process type corresponding to the storage module and a third process type corresponding to the sub-database management module;

the storage module is configured to: start a slave-process corresponding to each data type in an initialization phase, when a response process corresponding to the second process type receives the repackaged interaction request, determine a data type of data to be processed by the repackaged interaction request as a target data type based on the repackaged interaction request, and forward the repackaged interaction request to a slave-process corresponding to the target data type to cause the slave-process to perform data query or data storage based on the repackaged interaction request;

the subscribing and publishing module is configured to: when a response process corresponding to the first process type receives the repackaged interaction request, perform a subscribing response action or a publishing response action based on the repackaged interaction request; and the sub-database management module is configured to:

when a response process corresponding to the third process type receives the repackaged interaction request, and the repackaged interaction request is a state reading interaction request, perform a state reading response action based on a pre-established sub-database state list to determine a state of a sub-database required for the repackaged interaction request; or when a response process corresponding to the third process type receives the repackaged interaction request, and the repackaged interaction request is a state switching interaction request, determine a to-be-switched sub-database, and perform a state switching response action to update, in a pre-established sub-database state list, a state of the to-be-switched sub-database.

2. The system of claim 1, wherein the storage module is configured to: in the initialization phase, establish a process state data block of a slave-process corresponding to each data type in a preset process state list, and establish a data table corresponding to each sub-database based on a preset number of sub-databases.

3. The system of claim 1, wherein the sub-database management module is further configured to:

establish a sub-database state list in the initialization phase, wherein the sub-database state list comprises a sub-database state data block corresponding to each sub-database, and the sub-database state data block is configured to abstractly represent a state of a sub-database;

in response to determining that the repackaged interaction request received is a state reading interaction request, determine information in the sub-database state data block of the sub-database required for the repackaged interaction request by querying the sub-database state list, and return the information to the client; and in response to determining that the repackaged interaction request received is a state switching interaction request, determine a to-be-switched sub-database, update, in the sub-database state list, a sub-database state data block of the to-be-switched sub-database, and after updating the sub-database state data block, send an instruction for switching the sub-database to the storage module or the client interaction module.

4. The system of claim 1, wherein an inter-process communication channel is maintained between the client interaction module and the subscribing and publishing module, between the client interaction module and the storage module, and between the client interaction module and the sub-database management module.

5. The system of claim 1, wherein the client comprises at least one of a local client or a remote client; and the client interaction module is further configured to:

establish a client state list in the initialization phase, wherein the client state list comprises a client state data block, and the client state data block is configured to represent state information of the client; and when receiving the interaction request from the client, query the client state list, and when the client state list does not comprise the client sending the interaction request, establish a client state data block of the client in the client state list.

6. The system of claim 1, wherein the client interaction module is further configured to: periodically determine whether a client is out-of-connection, and when a client is out-of-connection, inform the subscribing and publishing module, the storage module, and the sub-database management module.

7. The system of claim 1, wherein the interaction request carries a name of an interaction instruction and parameters; the client interaction module is further configured to:

establish an interaction instruction list in the initialization phase, wherein the interaction instruction list stores names of interaction instructions and processing templates associated with the names of the interaction instructions, and the processing templates each comprises a response process start interface, a package interface, and a send interface; and based on the name of the interaction instruction obtained by analyzing the interaction request, query the interaction instruction list to obtain a processing template, and call a response process start interface for determining whether a response process is started, and when the response process is not started, start the response process and establish an inter-process communication channel.

8. The system of claim 7, wherein the client interaction module is further configured to: repackage the interaction request by the package interface, and send the repackaged interaction request to the response process by the send interface.

9. The system of claim 1, wherein the subscribing and publishing module is further configured to:

establish a subscription information list in the initialization phase, wherein the subscription information list comprises a subscription information data block, and the subscription information data block comprises a subscription client descriptor, subscription channel information, a subscription message label and a message buffer;

establish and/or update the subscription information data block in the subscription information list when a subscription interaction request is received; and traverse the subscription information list, fill the message buffer based on the subscription channel information in the subscription information list, and send information in the message buffer to the client by the subscription client descriptor, when a publishing interaction request is received.

10. The system of claim 2, wherein the process state data block comprises a process descriptor, an inter-process communication descriptor, a process state label bit, and a data transmission buffer.

11. A data processing method, performed by a server, and comprising:

receiving an interaction request sent by a client;

analyzing the interaction request to obtain an analyzing result;

based on the analyzing result, determining a process type to be started and starting a response process of the process type;

repackaging the interaction request and sending the repackaged interaction request to the response process, wherein the process type comprises a first process type, a second process type and a third process type;

starting a slave-process corresponding to each data type in an initialization phase;

when a response process corresponding to the second process type receives the repackaged interaction request, determining a data type of data to be processed by the repackaged interaction request as a target data type based on the repackaged interaction request, and forwarding the repackaged interaction request to a slave-process corresponding to the target data type to cause the slave-process to perform data query or data storage based on the repackaged interaction request;

when a response process corresponding to the first process type receives the repackaged interaction request, performing a subscribing response action or a publishing response action based on the repackaged interaction request; and when a response process corresponding to the third process type receives the repackaged interaction request, and the repackaged interaction request is a state reading interaction request, performing a state reading response action based on a pre-established sub-database state list to determine a state of a sub-database required for the repackaged interaction request; or when a response process corresponding to the third process type receives the repackaged interaction request, and the repackaged interaction request is a state switching interaction request, determining a to-be-switched sub-database, and performing a state switching response action to update, in a pre-established sub-database state list, a state of the to-be-switched sub-database.

12. The method of claim 11, wherein the client comprises at least one of a local client or a remote client, and the method further comprises:

establishing a client state list in the initialization phase, wherein the client state list comprises a client state data block, and the client state data block is configured to represent state information of the client; and when receiving the interaction request from the client, querying the client state list, and when the client state list does not comprise the client sending the interaction request, establishing a client state data block of the client in the client state list.

13. The method of claim 11, further comprising:
periodically determining whether a client is out-of-connection.

14. The method of claim 11, wherein the interaction request carries a name of an interaction instruction and parameters; and the method further comprises:
establishing an interaction instruction list in the initialization phase, wherein the interaction instruction list stores names of interaction instructions and processing templates associated with the names of the interaction instructions, and the processing templates each comprises a response process start interface, a package interface, and a send interface; and
based on the analyzing result, determining a process type to be started and starting a response process of the process type comprises:
based on the name of the interaction instruction obtained by analyzing the interaction request, querying the interaction instruction list to obtain a processing template, and calling a response process start interface for determining whether a response process is started, and when the response process is not started, starting the response process and establishing an inter-process communication channel.

15. The method of claim 11, further comprising: in the initialization phase, establishing a process state data block of a slave-process corresponding to each data type in a preset process state list, and establishing a data table corresponding to each sub-database based on a preset number of sub-databases.

16. The method of claim 11, further comprising:
establishing a sub-database state list in the initialization phase, wherein the sub-database state list comprises a sub-database state data block corresponding to each sub-database, and the sub-database state data block is configured to abstractly represent a state of a sub-database;
in response to determining that the repackaged interaction request received is a state reading interaction request, determining information in the sub-database state data block of the sub-database required for the repackaged interaction request by querying the sub-database state list, and returning the information to the client; and
in response to determining that the repackaged interaction request received is a state switching interaction request, determining a to-be-switched sub-database, and updating, in the sub-database state list, a sub-database state data block of the to-be-switched sub-database.

17. The method of claim 11, further comprising:
establishing a subscription information list in the initialization phase, wherein the subscription information list comprises a subscription information data block, and the subscription information data block comprises a subscription client descriptor, subscription channel information, a subscription message label and a message buffer;
establishing and/or updating the subscription information data block in the subscription information list when a subscription interaction request is received; and
traversing the subscription information list, filling the message buffer based on the subscription channel information in the subscription information list, and sending information in the message buffer to the client by the subscription client descriptor, when a publishing interaction request is received.

18. A non-transitory computer readable storage medium, storing computer programs thereon, wherein the computer programs, when executed by a processor, cause the processor to perform the method of claim 11.

19. An electronic device, comprising:
a processor; and
a memory storing computer programs executable by the processor,
wherein the processor is configured to, when executing the computer programs, perform operations comprising:
receiving an interaction request sent by a client;
analyzing the interaction request to obtain an analyzing result;
based on the analyzing result, determining a process type to be started and starting a response process of the process type;
repackaging the interaction request and sending the repackaged interaction request to the response process, wherein the process type comprises a first process type, a second process type and a third process type;
starting a slave-process corresponding to each data type in an initialization phase;
when a response process corresponding to the second process type receives the repackaged interaction request, determining a data type of data to be processed by the repackaged interaction request as a target data type based on the repackaged interaction request, and forwarding the repackaged interaction request to a slave-process corresponding to the target data type to cause the slave-process to perform data query or data storage based on the repackaged interaction request;
when a response process corresponding to the first process type receives the repackaged interaction request, performing a subscribing response action or a publishing response action based on the repackaged interaction request; and
when a response process corresponding to the third process type receives the repackaged interaction request, and the repackaged interaction request is a state reading interaction request, performing a state reading response action based on a pre-established sub-database state list to determine a state of a sub-database required for the repackaged interaction request; or when a response process corresponding to the third process type receives the repackaged interaction request, and the repackaged interaction request is a state switching interaction request, determining a to-be-switched sub-database, and performing a state switching response action to update, in a pre-established sub-database state list, a state of the to-be-switched sub-database.

* * * * *